United States Patent
Casanova et al.

(10) Patent No.: US 7,660,526 B2
(45) Date of Patent: Feb. 9, 2010

(54) THROUGH CHANNEL LOSS PREVENTION AT A WDM NODE

(75) Inventors: Mauro Rudi Casanova, Carugate (IT); Lorenzo Ghioni, Casalmaiocco (IT); Andrea Marchio, Limido Comasco (IT)

(73) Assignee: Cisco Technology, Inc., San Jose, CA (US)

( * ) Notice: Subject to any disclaimer, the term of this patent is extended or adjusted under 35 U.S.C. 154(b) by 527 days.

(21) Appl. No.: 10/987,181

(22) Filed: Nov. 12, 2004

(65) Prior Publication Data

US 2006/0104641 A1 May 18, 2006

(51) Int. Cl.
*H04J 14/00* (2006.01)
(52) U.S. Cl. .................................... 398/7; 398/83
(58) Field of Classification Search ............. 398/83–85, 398/2, 7
See application file for complete search history.

(56) References Cited

U.S. PATENT DOCUMENTS

| | | | |
|---|---|---|---|
| 6,320,996 | B1 | 11/2001 | Scobey et al. |
| 6,466,341 | B1 * | 10/2002 | Lumish et al. ............... 398/82 |
| 6,647,174 | B2 * | 11/2003 | Gooding et al. ............. 385/18 |
| 2001/0026384 | A1 | 10/2001 | Sakano et al. |
| 2002/0021861 | A1 | 2/2002 | Gnauck et al. |
| 2002/0159115 | A1 * | 10/2002 | Rumer ...................... 359/123 |
| 2003/0002104 | A1 * | 1/2003 | Caroli et al. ............... 359/127 |
| 2003/0193955 | A1 | 10/2003 | Beshai |
| 2003/0210870 | A1 | 11/2003 | Graves |
| 2004/0208542 | A1 | 10/2004 | Peddanarappagari et al. |
| 2004/0213564 | A1 | 10/2004 | Sakano et al. |

OTHER PUBLICATIONS

Cisco, Inc., "Cisco ONS 15216 100 GHz OADM Operations Guide," Release 2.2., Nov. 2002.*

* cited by examiner

*Primary Examiner*—Christina Y Leung

(57) ABSTRACT

At a WDM add/drop node of an optical fiber, an add/drop multiplexer system with opto-electric components in the through channel path has an optical switch connected in parallel with an add/drop multiplexer. Upon a power loss to the add/drop multiplexer, the optical switch bypasses the add/drop multiplexer so that WDM channel signals pass through the WDM add/drop node without interference from the unpowered add/drop multiplexer. Loss of through channels at the node is prevented. Upon a return of power, the optical switch reroutes the WDM signals on the optical fiber to the add/drop multiplexer but after the add/drop multiplexer is fully operational.

12 Claims, 5 Drawing Sheets

THROUGH CHANNEL LOSS PREVENTION AT A WDM NODE

BACKGROUND OF THE INVENTION

The present invention is related to in general WDM (Wavelength Division Multiplexing) optical network systems and, more particularly, to systems and methods for protecting the loss of through communication channels at an add/drop node in the event of a power failure.

In WDM systems, multiple optical signals having different wavelengths share an optical fiber, each wavelength defining a particular communication channel. Hence WDM systems include any system using optical wavelengths to define channels, such as DWDM (Dense Wave Division Multiplexing). This technique of wavelength division multiplexing has many advantages in implementing optical communication systems, including increased capacity and the ability to use passive optical components to redirect a portion of the data flowing along the optical fiber for processing at an intermediate node.

A representative WDM system may include multiple nodes connected to one another by optical fiber. For example, the nodes may be connected in a ring. Each node typically uses only certain wavelengths (also referred to as WDM channels) for transmission and reception and leaves the other wavelengths untouched. The untouched wavelengths form through channels at the node. A WDM add/drop multiplexer isolates and removes (or "drops") selected WDM channels from the optical fiber at a node. The channels that are dropped in this way are processed by receiver circuitry within the node or are otherwise rerouted. Signals may also be generated on these channels for transmission onto the fiber at the node. The add/drop multiplexer combines (or "adds") these new signals to the through channels at the node. Hence the add/drop multiplexer implements the drop and add functions of the node, which itself is often termed an add/drop node on the optical fiber.

One problem for many of these add/drop multiplexers is their opto-electric components render the multiplexers susceptible to power outages. For example, reconfigurable add/drop multiplexers rely on opto-electric components to select the particular add or drop channels (and through channels). Changes in the selected channels can be made easily. A subtle point is that the opto-electric components control signal strengths in the through channels of the add/drop multiplexer. With power outages, the operation of the opto-electric components (and the add/drop multiplexer) is interrupted. Of course, a way of avoiding such interruptions to supply the add/drop multiplexers with uninterruptible power sources. This solution, however, considerably increases the costs of the multiplexers. Another solution is to avoid electrical components altogether; however, the resulting add/drop multiplexers are considerably restricted in the flexibility of their operations.

The present invention addresses this challenge with an add/drop multiplexer system which permits through channels to continue at a node despite a power outage at relatively low cost. In this manner only the node with the power loss is affected and the other interconnected nodes remain in operation to keep the optical network in operation.

SUMMARY OF THE INVENTION

For an add/drop node on an optical fiber carrying WDM signals, the present invention provides for an add/drop multiplexer system which has an WDM add/drop multiplexer and an optical switch. The add/drop multiplexer has an input terminal which receives WDM signals from the optical fiber; an output terminal which transmits WDM signals to the optical fiber; at least one drop terminal for selected drop channels of WDM signals from the optical fiber; at least one add terminal for selected add channels of WDM signals channels to the optical fiber, and at least one opto-electric device in a path of at least one through channel of WDM signals from the input terminal to the output terminal such that a loss of power to the opto-electric device adversely affects the at least one through channel of WDM signals. The optical switch is connected to the optical fiber in parallel to the add/drop multiplexer and is operative when power to the at least one opto-electric device is lost to bypass the input and output terminals of the add/drop multiplexer. The at least one through channel of WDM signals is maintained through the add/drop node despite the power loss. Furthermore, the optical switch is operative when power to the at least one opto-electric device is restored after the WDM add/drop multiplexer is fully operational to reconnect the input and output terminals of the WDM add/drop multiplexer to the optical fiber.

The present invention also provides for a method of operating the add/drop multiplexer system which comprises the steps of receiving WDM signals from the optical fiber at the input terminal of the add/drop multiplexer system; transmitting WDM signals to the optical fiber at an input terminal of the add/drop multiplexer system; dropping at least one selected channel of WDM signals from the optical fiber; adding at least one selected channel of WDM signals to the optical fiber, and bypassing the input terminal and the output terminal of the add/drop multiplexer when power to the at least one opto-electric device is lost so that the at least one through channel of WDM signals is maintained through the add/drop node despite the loss of power. The method of operation also includes reconnecting the input and output terminals of the WDM add/drop multiplexer to the optical fiber when power to the at least one opto-electric device is restored and after the WDM add/drop multiplexer is fully operational.

DESCRIPTION OF SPECIFIC EMBODIMENTS

Figure 1:
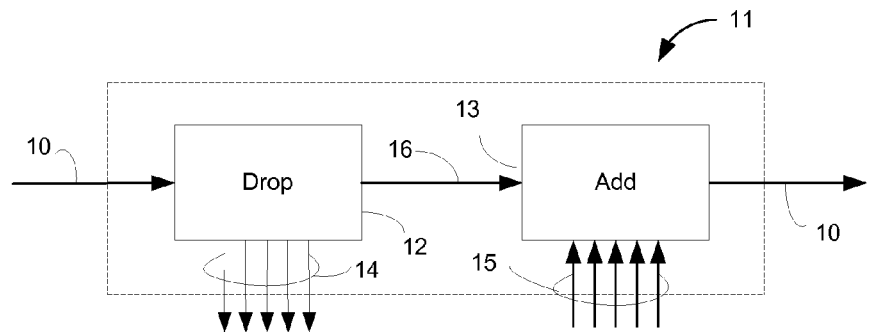
FIG. 1 is a drawing of a representative add/drop multiplexer.

FIG. 1 is a general representative drawing of an add/drop multiplexer 11 for an add/drop node on an optical fiber 10. It should be noted that the term, "multiplexer," is used in optical communication systems to loosely cover devices and combination of devices at different levels of complexity and organization. For example, add/drop multiplexers which are the subject of the present invention often contain constituent elements which are also termed "multiplexers" (or demultiplexers). These multiplexer elements are often interferometric in fundamental nature, and internally may be Mach-Zehnder interferometers, Fabry-Perot interferometers, arrayed waveguide gratings, devices based on crystal-based Fourier filter technology, etc. For purposes of clear exposition, such constituent elements are called multiplexer elements below. Furthermore, only one optical fiber 10 is shown for the purposes of clarity. Typical optical networks, such as SONET/SDH networks, operate with two optical fiber carrying signals in opposite directions.

Illustrative of the nominal functions of an add/drop multiplexer, the multiplexer 11 of FIG. 1 has a drop unit 12 by which selected WDM channels are dropped from the optical fiber 10 and accessed through drop terminals 14. The multiplexer 11 also has an add unit 13 by which selected WDM channels from add terminals 15 are added to the optical fiber 10. Through channels are carried from the drop unit 12 to the add unit over path 16. Despite a loss of power to the multiplexer 11 and the possible loss of drop channels at the terminals 14 and/or add channels from the terminals 15, the present invention is concerned about the protection of the channels passing through the multiplexer 11. As long as the through channels are maintained, the other nodes of the optical fiber 10 can continue to operate despite the power loss to the add/drop multiplexer 11.

Figure 2A:
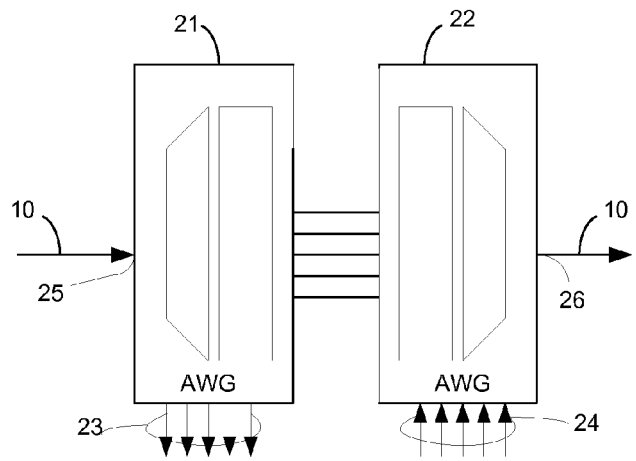
FIG. 2A is a drawing of an add/drop multiplexer with passive components.

Add/drop multiplexers may be implemented with many different component devices. Some multiplexers have no opto-electric components and are passive; no electrical power is required for their operation and the components are unaffected by a loss of electrical power. FIG. 2A illustrates an exemplary passive add/drop multiplexer with no opto-electric components. A first AWG (Array WaveGuide) 21 operates as a demultiplexer element for the drop function and only one input terminal 25 of the nominal m×m, substrate-based, AWG 21 is used to receive WDM channel signals on the optical fiber 10. Some of the m output terminals are used as drop terminals 23 and the remaining output terminals are connected to a corresponding number of input terminals of a second AWG 22. The remaining input terminals of the AWG 22 are used as add terminals 24 and only one output terminal of the nominal m×m organization of the AWG 22 is used as an output terminal 26, which is connected to the optical fiber 10. Each wavelength is carried over a separate fiber between the demultiplexer element 21 and the multiplexer element 22, as well as between the multiplexer element 22 and the add ports 24, and between the demultiplexer element 21 and the drop ports 23.

While this add/drop multiplexer operates despite a power loss, dropping, adding or passing a wavelength through is made by disconnecting and reconnecting the optical fibers. This manual reconfiguration requires more work and is error prone. Hence this add/drop multiplexer is inflexible and does not adapt easily to change.

Figure 2B:
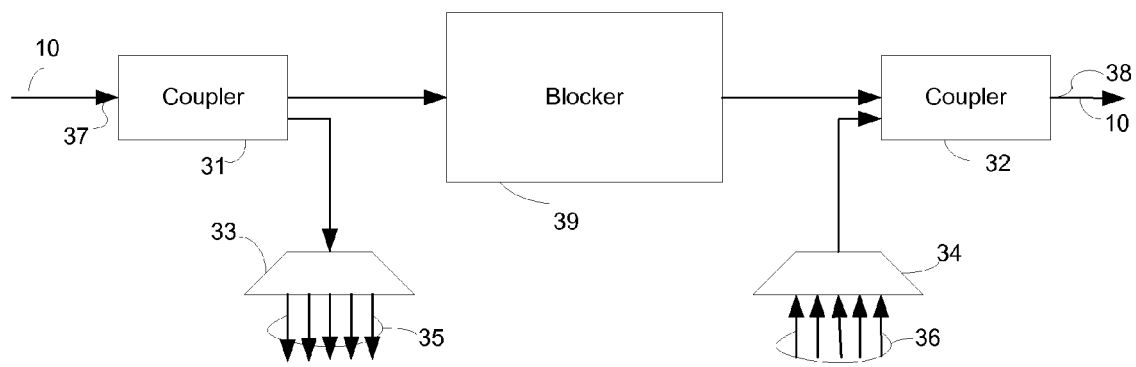
FIG. 2B is a drawing of a reconfigurable add/drop multiplexer with a wavelength blocker.

On the other hand, add/drop multiplexers with opto-electric components typically have enhanced functions of the add/drop multiplexer which are not present in add/drop multiplexers without opto-electric components. FIG. 2B illustrates an add/drop multiplexer with an opto-electric component and a subtlety in add/drop multiplexer design: that the multiplexers have not only drop and add functions, but also a third function, that of wavelength channel blocking which is often a part of the drop unit or add unit. The drop function refers to the diversion of signals of one or more WDM channels at an optical fiber node and the add function refers to the insertion of WDM channel signals at the optical fiber node. Typically, the dropped and added WDM channels are the same and the blocking function keeps the signals of the dropped channels from interfering with the signals of the added channels in the optical fiber. The unblocked channels are the through channels.

In the FIG. 2B add/drop multiplexer, the units for the drop and add functions do not require power but the through channel operations are controlled by an opto-electric component. Simple couplers 31 and 32 are inserted on the optical fiber 10 for the drop and add functions respectively. The first coupler 31 receives the incoming WDM signals on the optical fiber 10 at an input terminal 37 and splits the signals. Most of the WDM signal power is sent toward the second coupler 32 and a minority of the WDM signal power is diverted to a Gaussian AWG 33 operating as a demultiplexer element. The AWG 33 splits the WDM signals further onto drop terminals 35. Again arrangements must be made at the drop terminals 35 to select the particular signals for the WDM drop channels. The second coupler 32 provides the add function and is connected to a second Gaussian AWG 34, operating as a multiplexer element, with add terminals 46 for the WDM signals to be added through the coupler 32. The coupler 32 merges these signals equally in power with signals from the first coupler 31 at the output terminal 38 connected to the optical fiber 10.

To ensure that the added WDM signals are not interfered with by signals from the first coupler 31, a wavelength blocker 39 is placed between the two couplers 31 and 32. In response to control signals, the reconfigurable wavelength blocker 39 blocks the signals of selected WDM channels from the first coupler 31. Signals in these selected WDM channels are added by the add terminals 36 through the second coupler 32.

Figure 3A:
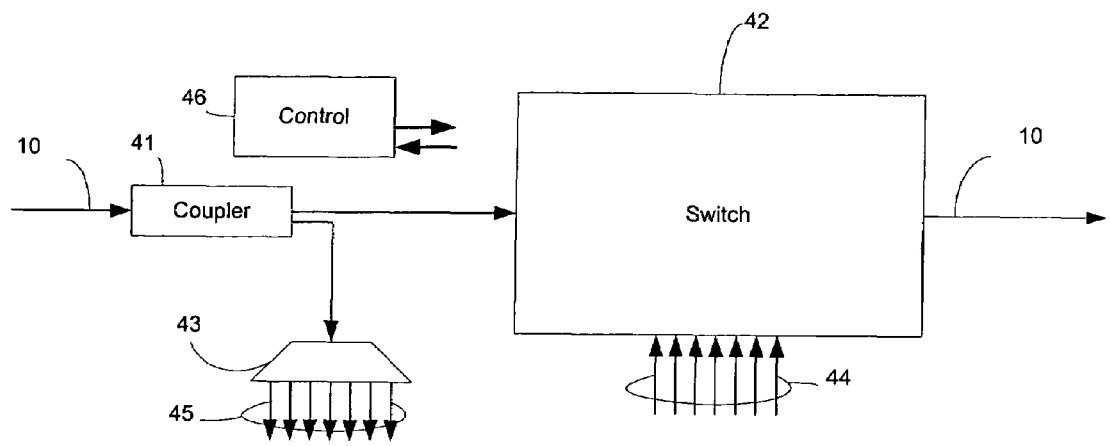
FIG. 3A shows the general organization of a reconfigurable add/drop multiplexer with a wavelength selective switch for the add unit.
Figure 3B:
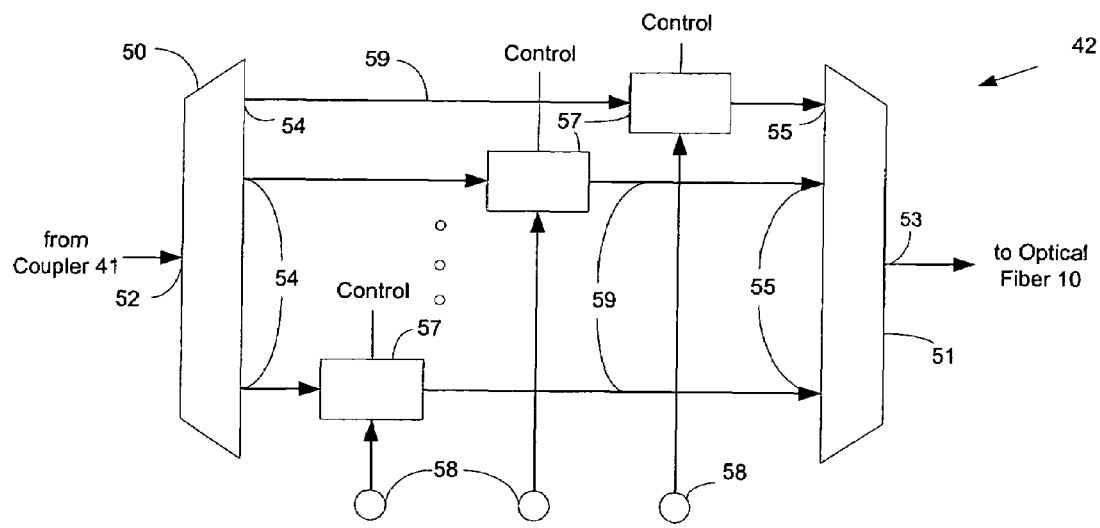
FIG. 3B is illustrates the organization of the wavelength-selective switch of FIG. 3B.
Figure 3C:
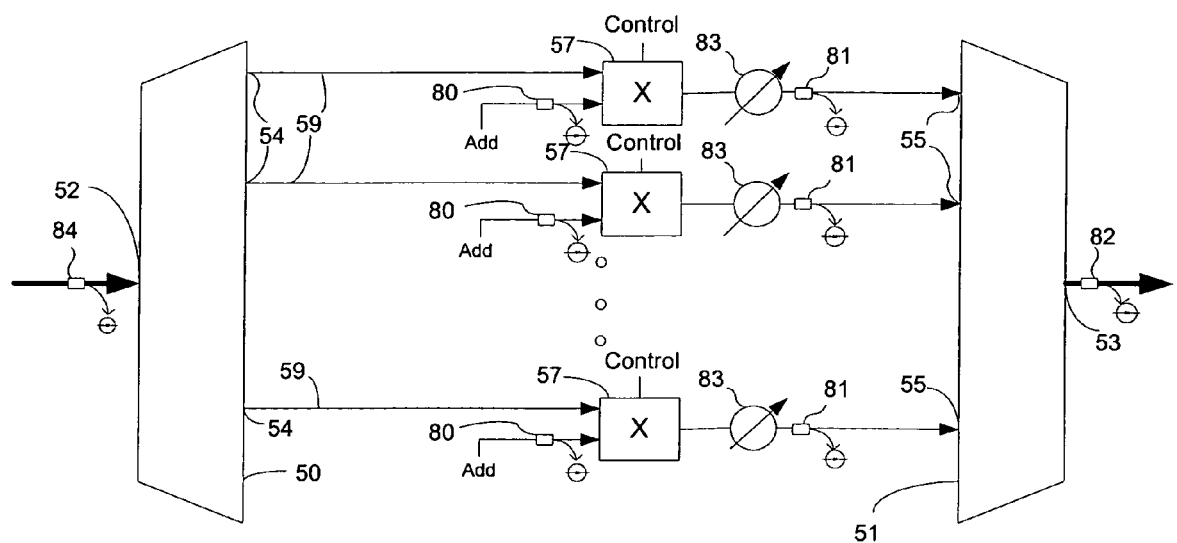
FIG. 3C shows further details of the wavelength-selective switch of FIG. 3B.

FIGS. 3A, 3B and 3C illustrate another reconfigurable add/drop multiplexer and which is the subject of U.S. patent application Ser. No. 10 959,366, entitled "Optical Add/Drop Multiplexer with Reconfigurable Add Wavelength Selective Switch," filed Oct. 6, 2004 and assigned to the present assignee, and which is incorporated by reference. The present invention is specifically adapted to this add/drop multiplexer but is readily adaptable to other add/drop multiplexers.

FIG. 3A illustrates the general organization of the reconfigurable optical add/drop multiplexer, which has a coupler 41 connected to the optical fiber 10 and a demultiplexer element 43 for the drop function. The coupler 41 splits off a portion of the WDM signals carried on the optical fiber 10. While the power of the WDM signals can be split evenly, a minority portion of the power is preferably directed toward the demultiplexer element 43; most of the power is directed through the coupler 41 to a wavelength-selective switch 42. For example, an coupler, may direct 70-90% of the optical power of the WDM signals through the coupler 41 and the balance of the power diverted to the demultiplexer element 43. In turn, the demultiplexer element 43, such as a Gaussian AWG, separates the split-off signals into constituent WDM channels at drop terminals 45. The wavelength-selective switch 42, which has its output terminal 53 connected to the optical fiber 10, receives the passed signals from the coupler 41 for the add (and blocking) function. Optical switching may be implemented in MEMS (MicroElectroMechanicalSystems) technology or PLC (Planar Lightguide Circuit) technology. Finally, a control unit 46 directs operations with control signals to and from the wavelength-selective switch 42.

FIG. 3B illustrates the organization of the wavelength-selective switch 42 which is suitable for integration on a single PLC substrate. The switch 42 has a demultiplexer element 50, a multiplexer element 51 and a plurality of 2×1 switches 57. An input terminal 52 of the demultiplexer element 50 receives the WDM signals from the coupler 41 which are separated on output terminals 54 and connected signal paths 59. While only three paths 59 are shown, it is understood that there are preferably 32 paths for each WDM channel into which the demultiplexer element 50 separates the WDM signals. Signals in each WDM channel can then be controlled by the switch 42. Of course, other number of paths can be used with the appropriate changes in switch operation.

Each of the signal paths 59 are connected to one of the input terminals 55 of the multiplexer element 51 through a 2×1 switch 57. Each switch 57 has an output terminal connected to its respective input terminal 55 of the multiplexer 51 and two input terminals, the first connected to its respective output terminal 54 of the demultiplexer 50 and the second input terminal to an add terminal 58, which in turn is connected to a WDM signal source. Responsive to a signal on a control line from the control unit 46, each switch 57 operates in two modes to either pass signals from the demultiplexer output terminal 54 to the multiplexer input terminal 55 or to add signals from its add terminal 28 to the multiplexer input terminal 55. It should be noted that when the switch 57 selects one input terminal, signals from the other input terminal are blocked. For example, if the switch 57 is set to the add input terminal 58, WDM signals, i.e., through channels, from the coupler 41 are effectively blocked. Hence the wavelength-selective switch 42 desirably combines the blocking function along with the add function.

FIG. 3C illustrates the wavelength-selective switch 42 in greater detail. Optical power is monitored before and after each 2×1 switch 57 through monitoring nodes 80 and 81 respectively, which are each connected to photodiodes (shown symbolically). The photodiodes generate electrical signals indicative of the optical power of the optical signals at the monitoring nodes. Control lines and signals from the monitoring nodes through the photodiodes are not shown in the drawings. The monitoring node 80 is at the add input terminal of the switch 57 and the monitoring node 81 is on the output terminal of the switch 57 after a VOA (Variable Optical Attenuator) 83 which controls the power of the signal leaving the switch 57. Control lines and signals to the VOAs 83 are not shown in the drawings. The total output power from the multiplexer 51 is observed through a monitoring node 82 at the output terminal 53 of the multiplexer 51 and total input power to the demultiplexer 50 is monitored through a monitoring node 84 at the input terminal 52 of the demultiplexer 50. Hence power on the paths of the wavelength-selective switch 42 and through the constituent switches 57 is monitored through the monitoring nodes and independently controlled by the VOAs 83. The strength of the through channel signals are dependent upon the described opto-electric devices.

Advantageously, the add/drop multiplexer allows for an unlimited drop-and-continue operation. That is, an incoming WDM signal can be dropped by the coupler 41 and the same signal continued (a through channel) by the wavelength-selective switch 42 onto the optical fiber 10, as long as no signals of that dropped WDM channel are added. This operation of drop and continue permits easy video-on-demand (VoD) by which video, i.e., television, signals can be broadcast over optical fiber cable.

It should be evident that a loss of power affects not only the switches 57, but also the VOAs 83. That is, a power outage affects any opto-electric components in the path of the through channels. The present invention does not distinguish between particular add/drop multiplexer architectures, including quite complex ones as described above, or their particular opto-electric components. The present invention is readily adaptable solves the problem of power loss at low cost.

Figure 4:
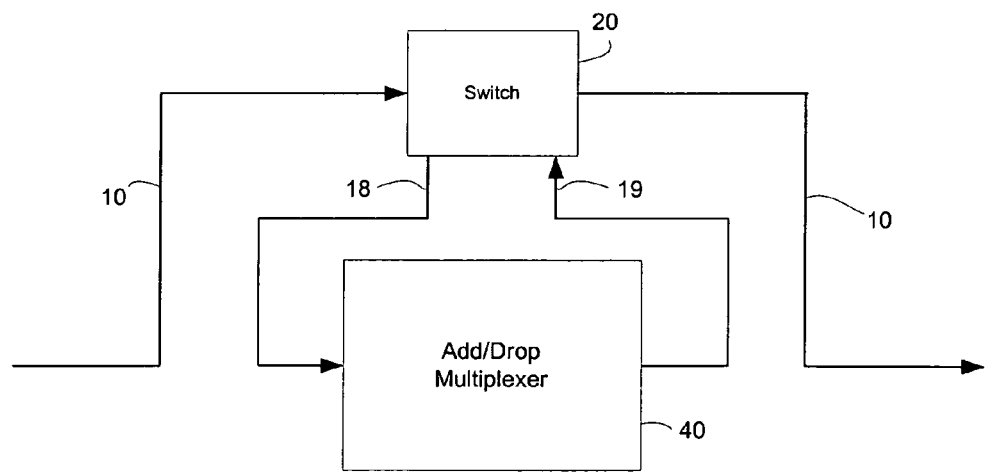
FIG. 4 illustrates the general organization of the add/drop multiplexer system of the present invention, according to one embodiment of the present invention.

The general organization of one embodiment of the present invention is shown in FIG. 4. Instead of being connected directly to the optical fiber 10, an add/drop multiplexer 40 is connected to the fiber 10 through an optical bypass switch 20. The switch 20 is connected to the optical fiber 10 and, as explained in detail below, in normal operation connects the add/drop multiplexer 40 to the optical fiber 10. Upon a power outage, the switch 20 bypasses the add/drop multiplexer 40 and optical signals pass directly through the switch 20, bypassing the add/drop multiplexer 40.

Figure 5A:
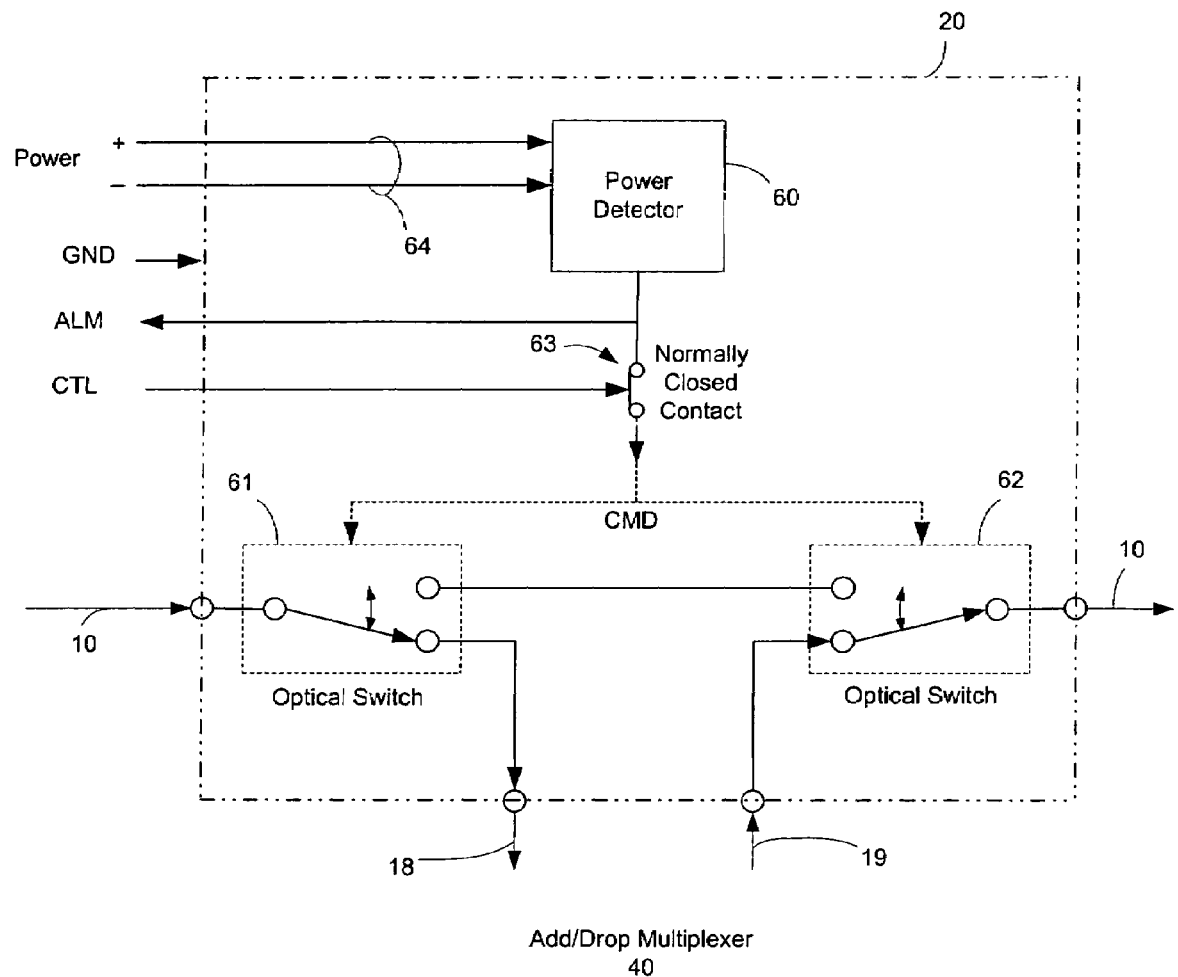
FIG. 5A illustrates the general organization of the bypass switch of FIG. 4.

FIG. 5A illustrates the general organization of the optical bypass switch 20 which has a power detector circuit 60 which operates like a latch in response to the state of the power lines 64 for the add/drop multiplexer 40. The power detector circuit 60 is also normally coupled to optical switches 61 and 62 through a switch contact 63. The switch contact 63 is normally closed but is responsive to a control signal CTL. With the switch contact 63 closed, the switches 61 and 62 are responsive to CMD control signals from the power circuit 60 as indicated by a dotted line to the switches 61 and 62. The switches 61 and 62 operate together so that 1) incoming signals on the optical fiber 10 are passed to the add/drop multiplexer 40 by optical fiber 18 and outgoing signals from the multiplexer 40 on optical fiber 19 are passed to the optical fiber 10 (the normal mode); or 2) incoming signals on the optical fiber 10 pass through the switch 20 back onto the optical fiber 10 (the bypass mode). Optical bypass switches from LuxLink, Inc. of Hicksville, N.Y. have been found to be preferable for the bypass switch 20.

Starting with a normal state of being power supplied on the lines 64, the CTL signal is open, the contact switch 63 is closed and the signal from the power detector circuit 60 is open (ALM is open). The CMD signal has a high impedance (open) and the optical switches 61 and 62 are in normal mode. Upon the loss of power, the signal from the power detector circuit 60 goes to ground (ALM is grounded) so that the CMD control signal is also grounded. In response, the optical switches 61 and 62 flip to bypass mode. When power returns to the power detector circuit 60, the CTL signal remains in an open state so that the contact switch 63 remains closed and the ALM signal from the power detector circuit 60 remains grounded. The CMD signal remains grounded and the switches 61 and 62 remain in bypass mode. Sometime after the return of the power supply, the CTL signal goes to ground to open the contact switch 63 and the CMD signal goes into a high impedance state and the switches 61 and 62 return to normal mode. The ALM signal also goes into an open state and resets the power detector circuit 60. Then the CTL signal returns to its normally open state leaving the ALM signal open and the contact switch 63 returns to its normally closed state. Operations have returned to the initially described state.

Figure 5B:
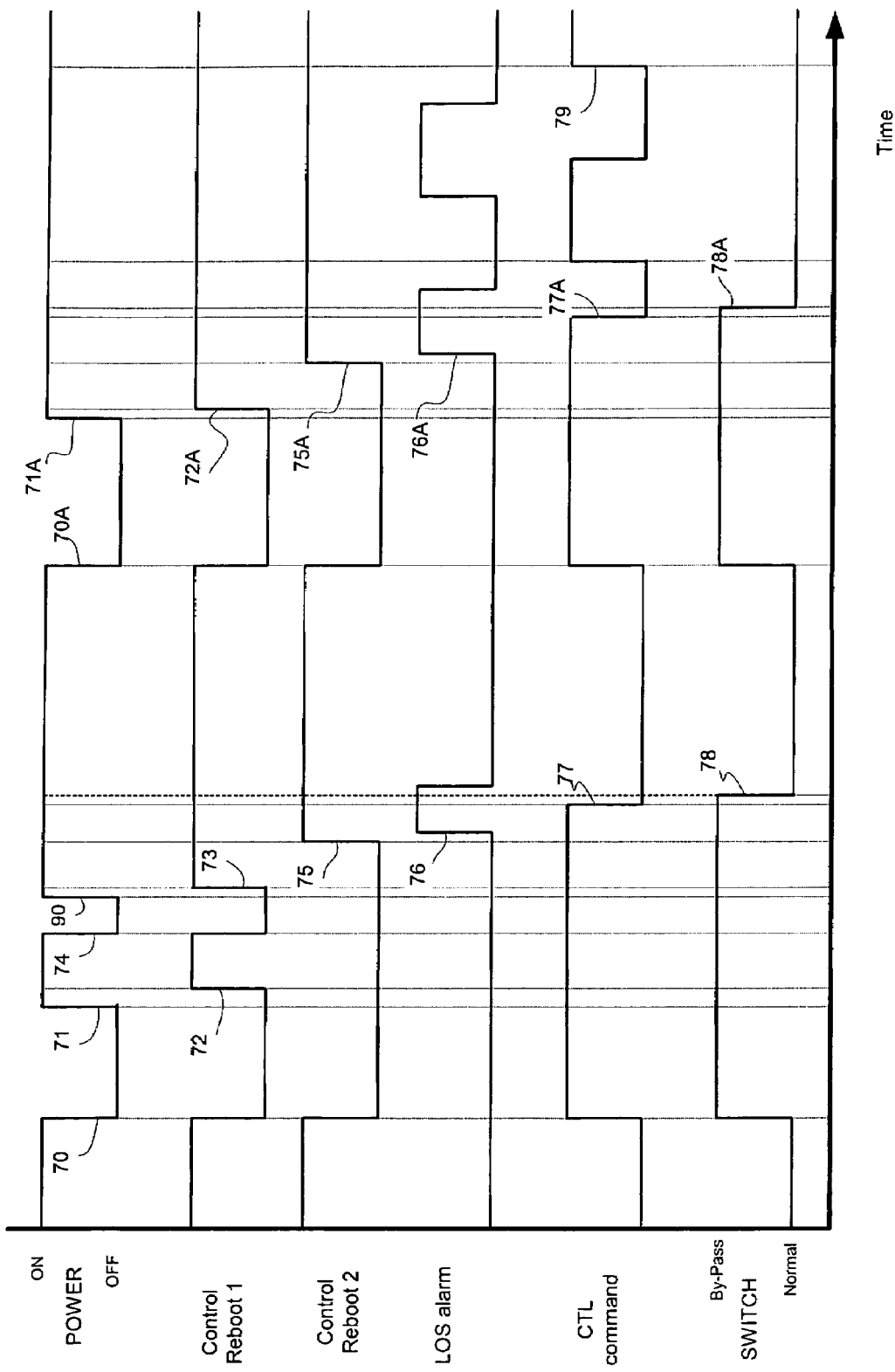
FIG. 5B is a timing diagram of the add/drop multiplexer system operations, according to one embodiment of the present invention.

FIG. 5B illustrates the timing of these signals and another aspect of the present invention, i.e., that the bypass switch 20 does not immediately return to normal mode when power is restored to the add/drop node. The bypass switch 20 returns to normal mode only after the opto-electric components of add/drop multiplexer have recovered from the loss of power. In this manner, any interference with the through channels is minimized.

The signals shown in FIG. 5B are Power, Control Reboot 1 and Control Reboot 2, LOS alarm, the CTL and the Switch signals. Power, CTL and Switch respectively are the power on the lines 64, the CTL control signal and the state of the bypass optical switch 20 (the switches 61 and 62) described above.

Control Reboot 1 and Control Reboot 2, LOS alarm are rebooting signals of an exemplary add/drop multiplexer system, specifically, the ONS 15454 Multiservice Transport Platform from Cisco Systems, Inc, to illustrate how the present invention operates in a particular system, in this case, a rather complex add/drop multiplexer system. The add/drop multiplexer described in FIGS. 3A-3C may be used for the add/drop multiplexer 40. The Control Reboot 1 signal represents the status rebooting process of the add/drop multiplexer system for the features of system timing, control, and switching functions and user-defined alarm conditions and controls, among others. The Control Reboot 2 signal represents the status of the optical portions of the add/drop multiplexer system and the LOS alarm represents a loss of optical signal alarm.

Reference numbers 70-78 indicate the occurrence of events. At event 70 power to the add/drop multiplexer 40 is initially lost. The bypass switch 20 goes from normal mode into bypass mode and the Control Reboot signals 1 and 2 go low. Power returns at event 71. A short time later one part of the reboot process is completed by the positive Control Reboot 1 signal at event 72. Note that a second part of the reboot process is incomplete, the Control Reboot 2 signal remains low. The Switch signal remains in bypass state. Before the rebooting process is complete, a new power outage occurs at event 74. Since the bypass switch 20 remains in the bypass mode, no through channels are affected. Power returns at event 90 and the Control Reboot 1 signal falls to indicate the initiation of another rebooting process. A short later (event 73) the Control Reboot 1 returns to high. Then the second part of the rebooting process is finally completed and the Control Reboot 2 signal goes high at event 75. With the return of functioning optics, the LOS alarm then spikes upward to indicate the loss of optical signals for the add/drop multiplexer system has been detected at event 76. This allows the CTL command signal goes to ground at event 77 and causes the bypass switch 20 to return to normal mode, event 78. With the bypass switch 20 in the normal mode, event 79 show that changes to the CTL command signal do not affect the status of the switch 20.

A second set of similar events are also labeled with same reference numerals and the suffix, "A". In this example, there is no loss of power as the system is rebooting.

Hence the present invention allows through channels to travel through an add/drop multiplexer system in spite of a loss of power. The multiplexer system can be simple and complex add/drop multiplexer systems.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

The invention claimed is:

1. A system comprising:
   a wavelength division multiplexed (WDM) add/drop multiplexer having an input terminal configured to receive WDM signals from an optical fiber, an output terminal configured to transmit WDM signals to said optical fiber, at least one drop terminal for selected drop channels of WDM signals from said optical fiber, at least one add terminal for selected add channels of WDM signals channels to said optical fiber, and at least one opto-electric device in a path of at least one through channel of WDM signals from said input terminal to said output terminal such that a loss of power to said opto-electric device adversely affects said at least one through channel of WDM signals; and
   an optical switch unit configured to be connected to said optical fiber in parallel with said add/drop multiplexer, said optical switch unit being configured to bypass said input and output terminals of said add/drop multiplexer when power to said at least one opto-electric device is lost and to reconnect said input and output terminals of said WDM add/drop multiplexer to said optical fiber a period of time after return of power to said at least one opto-electric device by which time said WDM add/drop multiplexer is fully operational; and
   wherein said WDM add/drop multiplexer is configured to perform a rebooting procedure after a power loss and to output a control signal to said optical switch unit after said rebooting procedure is complete corresponding to said period of time after return of power, and wherein the optical switch unit is configured to be responsive to said control signal to reconnect said input and output terminals of said WDM add/drop multiplexer to said optical fiber.

2. The system of claim 1, wherein said WDM add/drop multiplexer generates the control signal in responsive to determining a loss of optical signal indicating completion of said rebooting procedure.

3. A method comprising:
   receiving wavelength division multiplexed (WDM) signals from an optical fiber at an input terminal of an add/drop multiplexer system;
   transmitting WDM signals to said optical fiber at an input terminal of said add/drop multiplexer system;
   dropping at least one selected channel of WDM signals from said optical fiber;
   adding at least one selected channel of WDM signals to said optical fiber;
   bypassing said input terminal and said output terminal of said add/drop multiplexer when power to said at least one opto-electric device is lost so that said at least one through channel of WDM signals is maintained through said add/drop node despite power loss;
   continuing bypassing for a period of time after return of power to the at least one opto-electric device;
   generating a first signal when said WDM add/drop multiplexer is fully operational corresponding to the period of time after return of power; and
   reconnecting said input and output terminals of said WDM add/drop multiplexer to said optical fiber in response to said first signal.

4. The method of claim 3, and further comprising rebooting said WDM add/drop multiplexer after a power loss, and wherein generating comprises generating said first signal upon completing rebooting of the WDM add/drop multiplexer.

5. The method of claim 4, and further comprising determining a loss of optical signal at said WDM add/drop multiplexer indicating completion of said rebooting procedure.

6. A system comprising:
   means for receiving WDM signals from an optical fiber at an input terminal of an add/drop multiplexer system;
   means for transmitting WDM signals to said optical fiber at an input terminal of said add/drop multiplexer system;
   means for dropping at least one selected channel of WDM signals from said optical fiber;
   means for adding at least one selected channel of WDM signals to said optical fiber;

means for bypassing said input terminal and said output terminal of said add/drop multiplexer when power to said at least one opto-electric device is lost so that said at least one through channel of WDM signals is maintained through said add/drop node despite power loss, wherein said means for bypassing is configured to continuing to bypass said input terminal and output terminal of said add/drop multiplexer for a period of time after return of power to the at least one opto-electric device;

means for generating a first signal when said WDM add/drop multiplexer is fully operational corresponding to the period of time after return of power; and means for reconnecting said input and output terminals of said WDM add/drop multiplexer to said optical fiber responsive to said first signal.

7. The system of claim 6, and further comprising means for rebooting said WDM add/drop multiplexer after a power loss, and wherein said means for generating generates said first signal after said means for rebooting completes rebooting of said WDM add/drop multiplexer.

8. The system of claim 7, wherein said means for rebooting determines a loss of optical signal at the completion of rebooting of said WDM add/drop multiplexer.

9. A system comprising:

a wavelength division multiplexed (WDM) add/drop multiplexer having an input terminal configured to receive WDM signals from an optical fiber, an output terminal configured to transmit WDM signals to said optical fiber, at least one drop terminal for selected drop channels of WDM signals from said optical fiber, at least one add terminal for selected add channels of WDM signals channels to said optical fiber, and at least one opto-electric device in a path of at least one through channel of WDM signals from said input terminal to said output terminal such that a loss of power to said opto-electric device adversely affects said at least one through channel of WDM signals; and an optical switch unit configured to be connected to said optical fiber in parallel with said add/drop multiplexer such that said optical switch unit is configured to bypass said input and output terminals of said add/drop multiplexer when power to said at least one opto-electric device is lost and is configured to reconnect said input and output terminals of said WDM add/drop multiplexer to said optical fiber a period of time after return of power to said at least one opto-electric device by which time said WDM add/drop multiplexer is fully operational;

wherein the optical switch unit comprises a power detector configured to be coupled to power lines for the WDM add/drop multiplexer to detect when power to the WDM add/drop multiplexer is lost and to generate a command signal according to presence or loss of power, a first optical switch coupled to the input terminal and a second optical switch coupled to the output terminal, wherein during a normal mode when power is present, the first optical switch is responsive to the command signal to pass incoming signals on the optical fiber to the input terminal of the WDM add/drop multiplexer and the second optical switch is responsive to the command signal to pass outgoing signals from the output terminal of the WDM add/drop multiplexer to the optical fiber and during a bypass mode when power to the at least one opto-electric device is lost, the first optical switch is responsive to the command signal to pass incoming signals on the optical fiber to the second optical switch which is responsive to the command signal to pass the incoming signals back onto the optical fiber, thereby bypassing the WDM add/drop multiplexer.

10. The system of claim 9, wherein the optical switch unit further comprises a contact switch that is normally closed and is configured to receive the command signal from the power detector, the contact switch being responsive to a control signal output by the WDM add/drop multiplexer that is indicative of an operational state of the WDM add/drop multiplexer, and wherein the contact switch is configured to control the first and second optical switches such that when the contact switch is closed, the first and second optical switches are responsive to the command signal from the power detector.

11. The system of claim 10, wherein during a normal state when power is present, the WDM add/drop multiplexer is configured to generate a first state for the control signal causing the contact switch to remain closed, and wherein the power detector is configured to output a high impedance state for the command signal that causes the first and second optical switches to operate in normal mode, and when the power detector detects power loss, the power detector is configured to generate a ground state of the command signal that causes the first and second optical switches to operate in bypass mode, and wherein when the power detector detects that power has been restored, the WDM add/drop multiplexer is configured to continue to output the control signal in the first state for the period of time after power is restored so that the contact switch remains closed and the command signal from the power detector remains in the ground state such the first and second optical switches remain in the bypass mode until the control signal switches to a second state that causes the contact switch to open and the command signal returns to the high impedance state causing the first and second switches to operate in normal mode.

12. The system of claim 11, wherein the WDM add/drop multiplexer is configured to generate the second state for the control signal after completing a rebooting procedure corresponding to said period of time after return of power.

* * * * *

UNITED STATES PATENT AND TRADEMARK OFFICE
CERTIFICATE OF CORRECTION

PATENT NO. : 7,660,526 B2  Page 1 of 1
APPLICATION NO. : 10/987181
DATED : February 9, 2010
INVENTOR(S) : Casanova et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1006 days.

Signed and Sealed this

Twenty-eighth Day of December, 2010

David J. Kappos
*Director of the United States Patent and Trademark Office*